June 12, 1956 L. D. ARMSTRONG ET AL 2,750,542

UNIPOLAR SEMICONDUCTOR DEVICES

Filed April 2, 1953

INVENTORS
LORNE D. ARMSTRONG
& DIETRICH A. JENNY

BY J. L. Whittaker
ATTORNEY

United States Patent Office 2,750,542

Patented June 12, 1956

2,750,542

UNIPOLAR SEMICONDUCTOR DEVICES

Lorne D. Armstrong and Dietrich A. Jenny, Princeton, N. J., assignors to Radio Corporation of America, a corporation of Delaware Application April 2, 1953, Serial No. 346,452

6 Claims. (Cl. 317—235)

This invention pertains to semiconductor devices and particularly to such devices known as unipolar, field effect transistors. In such transistors, the conductance is affected by electric fields applied to the body of the device and current flow is generally by one type of carrier, i. e. either by electrons or holes. The changed conductance between input and output terminals results from changing the volume of the current flow path.

One type of unipolar transistor comprises a body of semiconductor material of one type of conductivity defining a flow path for current carriers. One or more regions of material of a different type of conductivity are formed on, around, or beneath opposite surfaces of the body and are separated from the body by rectifying barriers. Thus the body is provided with one or more control P-N junctions. The region or regions of different conductivity are biased in the reverse direction with respect to the body and the effective space charge associated with the rectifying barriers penetrates into the body a distance dependent on the magnitude of the reverse bias. The degree of penetration of the barrier space charge controls the conductance or resistance of the current path through the body. The deeper the penetration, the lower the conductance and vice versa.

Since current control is effected by the action of a barrier or barriers adjacent to a current path, and, in effect, squeezing the current path, the sensitivity of control depends, among other things, on the physical relationship between the barrier and the current path. In the type of device described above, the control of the conductance of the current path is rather insensitive since a comparatively large area path is controlled by a comparatively small area rectifying barrier. The lack of sensitivity is due, further, to the fact that the control means is disposed adjacent to the path to be controlled whereby the full effect thereof cannot be applied in the most advantageous manner to the large-area current path.

In a unipolar transistor of the type described above, the control P-N junction extends, preferably, completely across the current path in the crystal from one edge to another. Thus, current flow occurs in the body of the crystal and along the edge surfaces of the crystal and control is effected in these regions also. As is well known, it is difficult to prepare, by alloying techniques, a good P-N junction which extends across a crystal to the edges thereof. Furthermore current flow along the surface of a semiconductor body has different characteristics than current flow within the body whereby further complications result.

In the operation of a typical transistor, minority charge carriers are injected into a region of material having a relatively high concentration of majority charge carriers. In such a device, the minority carriers experience a time delay in transit through said region. On the other hand, in unipolar devices majority charge carriers passing through a semiconductor body approximate the passage of electrons through a metal. Thus the frequency response is considerably improved.

Furthermore, the typical transistor is a low input impedance, low voltage device in which the control elements draw current. In certain applications, it is desirable to have a semiconductor circuit control element having a high input impedance and operating by means of voltage applied thereto with substantially no current flow therethrough.

An important object of this invention is to provide a semiconductor device of new and improved form.

Another object is to provide an improved unipolar, field-effect semiconductor device utilizing majority charge carriers as current carrying means.

A further object is to provide an improved semiconductor device for operation at high frequencies.

A still further object is to provide an improved semiconductor device having sensitive conductance control means.

Another object is to provide an improved semiconductor device in which current flow is subject to control by voltage rather than by current flow.

Another object is to provide an improved semiconductor device having a comparatively high input impedance.

Another object is to provide an improved semiconductor device having a uniform, sharply defined, and readily controlled current flow path.

Still another object is to provide an improved semiconductor device which is particularly suited for operation as a variable and controllable resistance.

In general, the purposes and objects of this invention are accomplished by the provision of a semiconductor body having P-type and N-type conductivity regions separated by a rectifying barrier, i. e. a P-N junction, which is planar in form and substantially parallel to at least one surface of the body. A current flow path is established in one of the regions, the width of the path being defined by one surface of the body and the rectifying barrier parallel thereto. The ends of the current flow path are defined by a pair of conductive members mounted in ohmic contact on the surface of the body and intermediate to the edges of the body whereby edge and surface effects are avoided.

The invention is described with reference to the drawings wherein.

Similar reference characters are applied to similar elements throughout the drawing.

Figures 1, 2, 3, 4, 5, 6, 7:
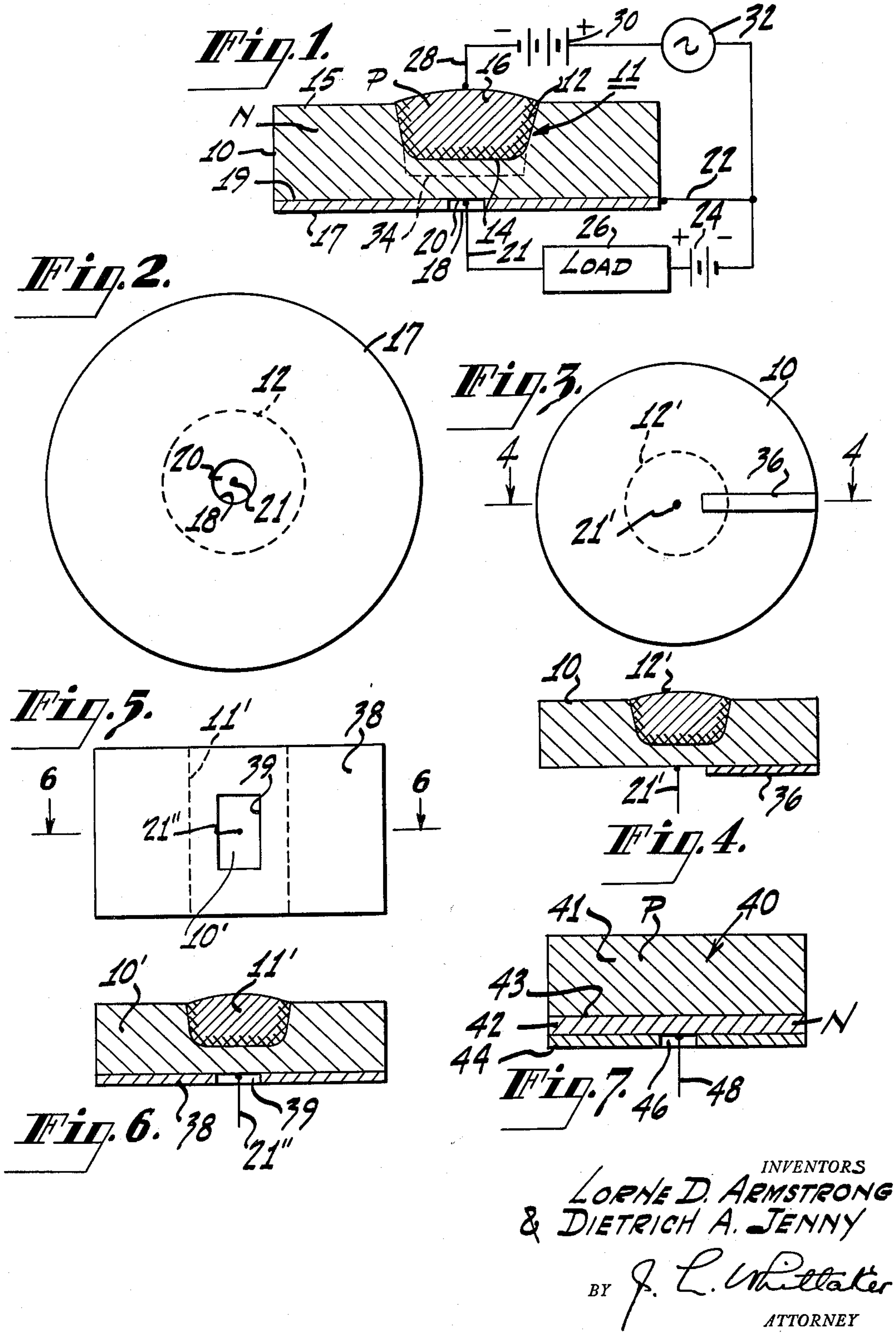
Fig. 1 is a sectional, elevational view of a semiconductor device embodying the present invention and a schematic circuit in which the device may be operated.
Fig. 2 is a bottom view of the device shown in Fig. 1.
Fig. 3 is a bottom view of a first modification of the invention.
Fig. 4 is a sectional elevational view of the device shown in Fig. 3 taken along the line 4—4.
Fig. 5 is a bottom view of a second modification of the invention.
Fig. 6 is a sectional elevational view of the device shown in Fig. 5 taken along the line 6—6.
Fig. 7 is a sectional elevational view of a third modification of the invention.

The device shown in Figure 1 comprises a disk 10 of semiconductor material, for example of N-type germanium, silicon or the like, preferably germanium, having a control P-N junction 11 including P-type region 12 and a rectifying barrier 14 separating the P-type region from the N-type body. In order to obtain optimum control, the barrier 14 is substantially planar in form and is parallel to a surface 15 of the body beneath which it is formed. The barrier should also be formed as close as possible to the surface 15. If desired, the body 10 may be of P-type conductivity material having a junction formed with N-type producing impurity material.

The P-N junction 11 is formed, preferably, according to a method described in a co-pending U. S. application of the present inventor, Serial Number 291,355, filed June 2, 1952 and assigned to the assignee of this invention. Briefly, according to this method a quantity of a suitable so-called impurity material is alloyed into the surface 15 of the body through a thin coating of a metal which has first been plated on said surface. The metal should be free of impurity material and is selected for its ability to alloy with the chosen impurity material. By this method, the P-type region 12 forms as a comparatively thin layer adjacent to the barrier 14 with a portion 16 of substantially intrinsic metal above it. If the body of the device comprises N-type germanium, then any one of indium, gallium, aluminum, zinc or boron, for example, may be used as the impurity material.

If the semiconductor body is of P-type material, then any one of phosphorus, arsenic, antimony, or bismuth, or any of these in alloy form, may be the impurity material. A suitable method for forming a P-N junction in a P-type body is described in a U. S. patent application of D. A. Jenny, Serial Number 309,867, filed September 16, 1952, and assigned to the assignee of this application.

According to the invention, a conductive plate or electrode 17, preferably in the form of metal disk of copper, nickel or the like having a central opening 18, is soldered or plated to the surface 19 of the body opposite that into which the impurity material has been alloyed to form the P-N junction 11. The central opening 18 is of as small a diameter as possible and, for best results, should have a diameter no greater, and preferably smaller, than the length of the rectifying barrier parallel to the surface 19 of the body 10. Thus a small portion 20 of the semiconductor body within the opening 18 forms an available current path for majorty charge carriers.

A lead 21 is soldered to the surface 19 of the body 10 at a point substantially at the center of the opening 18 in the disk 17 and another lead 22 is soldered to the metal disk. A battery 24 and a load device 26 are connected in series with the leads 21 and 22 to complete an external electrical circuit.

According to the invention, the control P-N junction 11 is biased in the reverse direction. In a device having an N-type body, such a bias is provided by a connection 28 from the portion 16 to the negative terminal of a battery 30, the positive terminal of which is connected to the plate 17. A signal source 32 is connected in circuit between the portion 16 and the disk 17.

With the arrangement described above, a current path extends from the battery 24, along the plate 17, through the portion 20 of the N-type body present between the edge of the plate adjacent to the central opening 18 and the lead 21, and through the load device 26. The resistance of the portion 20 of the body 10 between the plate 17 and the lead 21 is determined by its cross sectional area and its length and the resistivity of the semiconductor material. The reverse bias applied across the central P-N junction 11 by the battery 30 affects the initial depth of penetration of the space charge (represented by dash line 34) associated with the barrier 14 and thereby sets the initial D. C. resistance and D. C. current flow through the above-defined current flow circuit.

When the signal from the source 32 is applied across the P-N junction 11, the effective penetration of the barrier increases or decreases as the signal increases in the negative and positive directions. As the barrier changes its position, the cross-section of the flow path in the body changes, as does its resistance. The current flow in the external circuit varies correspondingly in Ohm's Law fashion.

As an example of operation, a typical device such as that shown in Figure 1 includes an N-type germanium body or crystal having a thickness of seven mils. The impurity material comprises an indium disk having a diameter of 100 mils and a thickness of 25 mils. According to the above-mentioned Armstrong alloying method, the indium disk is alloyed through a thin gold plating on the germanium body by being heated at 500° C. for about one minute. This heating causes the P-N junction 11 to form from five to six mils below the alloyed surface of the germanium and approximately one mil from the opposite free surface 19. The lead 21 is of platinum and the disk 17 is of plated copper.

The principles of the invention may be embodied in devices having other configurations or individual components of the device described above may take different forms. For example, as shown in Figures 3 and 4, the disk electrode 17 may be replaced by a thin, narrow metal plate 36, the current path in the crystal 10 then being between the ohmic contact 21' and the end of the metal plate 36 adjacent thereto. In addition, as shown in Figures 5 and 6, a germanium crystal 10' may have a rectangular cross-section and the control P-N junction electrode 11' may extend substantially across the entire width of the crystal 10'. In this embodiment, the disk electrode 17 or plate 36 may be used or a rectangular plate 38 having an opening 39 of rectangular or other shape may be employed. A lead 21'' is also provided on the surface of the crystal 10' within the opening 39.

A further variation of the invention shown in Figure 7 comprises a semiconductor body 40 having a grown P-N junction including a P-type zone 41 and an N-type zone 42 separated therefrom by a rectifying barrier 43. The body 40 may be formed by a crystal growing operation such as that described by A. R. Moore in U. S. patent application, Serial Number 285,584, filed May 1, 1952, and assigned to the assignee of this application. A disk or rectangular electrode 44 having an opening 46 is bonded to the free surface of one of the zones of the body 40, e. g. zone 42 and a lead 48 is soldered to the body 40 within the opening 46. The electrode 44 and the body 40 may be varied in shape as described above with reference to the body 10 and disk 17.

What is claimed is:

1. A semiconductor device comprising a semiconductor body having zones of P-type and N-type conductivity separated by a rectifying barrier, at least one of said zones having a free planar surface, said barrier having a substantially planar surface disposed parallel to said free surface, an electric current path being defined by a portion of said one of said zones, the width of said path being defined by said barrier and said surface, a pair of ohmic contact electrodes connected to said free surface and defining the length of said current path, said electrodes being positioned with a minimum spacing between them, said electrodes being positioned intermediate the ends of said planar surface of said barrier.

2. A semiconductor device comprising a semiconductor body having zones of P-type and N-type conductivity separated by a rectifying barrier, at least one of said zones having a free planar surface, said barrier having a substantially planar surface disposed parallel to said free surface, an electric current path being defined by a portion of said one of said zones, the width of said path being defined by said barrier and said surface, a pair of ohmic contact electrodes connected to said free surface and defining the length of said current path, said electrodes being positioned with a minimum spacing between them, said electrodes being positioned intermediate the ends of said planar surface of said barrier, one of said electrodes being in the form of a metal plate having a central aperture and the other electrode being a conductive lead positioned within said aperture.

3. A semiconductor device comprising a semiconductor body having zones of P-type and N-type conductivity separated by a rectifying barrier, at least one of said zones having a free planar surface, said barrier having a substantially planar surface disposed parallel to said free surface, an electric current path being defined by a portion of said one of said zones, the width of said path being defined by said barrier and said surface, a pair of ohmic contact electrodes connected to said free surface and defining the length of said current path, said electrodes being positioned with a minimum spacing between them, said electrodes being positioned intermediate the ends of said planar surface of said barrier, one of said electrodes comprising a narrow flat plate, and the other of said electrodes comprising a wire lead.

4. A semiconductor device comprising a semiconductor body having zones of P-type and N-type conductivity separated by a rectifying barrier, said barrier having a substantially planar form, one of said zones having a free planar surface substantially parallel to said barrier, an electric current path being defined by said one of said zones, an apertured metallic disk mounted on said one of said zones with the aperture positioned substantially coaxial with said barrier, said aperture being smaller than said barrier, and an electrode connected to said zones at a point substantially at the center of the aperture in said disk.

5. A semiconductor device comprising a body of semiconductor material having a free surface, a rectifying electrode in contact with said body and positioned adjacent to said surface, and a pair of ohmic electrodes in contact with said surface and defining the ends of a current path in said body, said rectifying electrode defining the width of said current path, the length of said current path being smaller than the length of said rectifying electrode.

6. A semiconductor device comprising a semiconductor body having a free surface, a rectifying electrode in contact with said body and positioned adjacent to said surface, said rectifying electrode being substantially planar and being disposed substantially parallel to said free surface, an electric current path being defined by a portion of said body, the width of said path being defined by said rectifying electrode and said surface, a pair of ohmic contact electrodes connected to said free surface and defining the length of said current path, said electrodes being positioned with a minimum spacing between them, said electrodes being positioned intermediate the ends of said planar surface of said barrier, one of said electrodes being in the form of a metal plate having a central aperture and the other electrode being a conductive lead positioned within said aperture.

References Cited in the file of this patent

UNITED STATES PATENTS

| | | |
|---|---|---|
| 1,900,018 | Lilienfeld | Mar. 7, 1933 |
| 2,502,488 | Shockley | Apr. 4, 1950 |
| 2,569,347 | Shockley | Sept. 25, 1951 |
| 2,603,694 | Kircher | July 15, 1952 |
| 2,618,690 | Stuetzer | Nov. 18, 1952 |
| 2,631,356 | Spark et al. | Mar. 17, 1953 |
| 2,648,805 | Spenke et al. | Aug. 11, 1953 |